(12) United States Patent
Lee et al.

(10) Patent No.: US 10,778,500 B2
(45) Date of Patent: Sep. 15, 2020

(54) METHOD FOR TRANSMITTING AND RECEIVING REFERENCE SIGNAL IN WIRELESS COMMUNICATION SYSTEM AND DEVICE THEREFOR

(71) Applicant: LG ELECTRONICS INC., Seoul (KR)

(72) Inventors: Kilbom Lee, Seoul (KR); Kyuseok Kim, Seoul (KR); Kijun Kim, Seoul (KR); Minki Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/313,840

(22) PCT Filed: Jun. 21, 2017

(86) PCT No.: PCT/KR2017/006503
§ 371 (c)(1),
(2) Date: Dec. 27, 2018

(87) PCT Pub. No.: WO2018/004180
PCT Pub. Date: Jan. 4, 2018

(65) Prior Publication Data
US 2019/0158342 A1 May 23, 2019

Related U.S. Application Data
(60) Provisional application No. 62/355,319, filed on Jun. 27, 2016.

(51) Int. Cl.
*H04W 72/04* (2009.01)
*H04L 27/38* (2006.01)
(Continued)

(52) U.S. Cl.
CPC ........... *H04L 27/389* (2013.01); *H04L 27/34* (2013.01); *H04L 27/3438* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2013/0336282 A1* 12/2013 Nakano ................ H04B 7/0456
370/330
2015/0257132 A1   9/2015 Park et al.
(Continued)

OTHER PUBLICATIONS

PCT International Application No. PCT/KR2017/006503,Written Opinion of the International Searching Authority dated Sep. 22, 2017, 25 pages.
(Continued)

*Primary Examiner* — Hassan A Phillips
*Assistant Examiner* — Prenell P Jones
(74) *Attorney, Agent, or Firm* — Lee Hong Degerman Kang Waimey

(57) ABSTRACT

A method by which a base station transmits a reference signal in a wireless communication system can comprise the steps of: transmitting, to a terminal, information on a modulation method of a reference signal for estimating a phase difference between symbols in a time domain; and transmitting, to the terminal, the reference signal, for estimating the phase difference between the symbols, to which the modulation method is applied.

13 Claims, 11 Drawing Sheets

(51) Int. Cl.
*H04L 27/34* (2006.01)
*H04L 27/36* (2006.01)
*H04L 5/00* (2006.01)

(52) U.S. Cl.
CPC ........ *H04L 27/364* (2013.01); *H04L 27/3863* (2013.01); *H04L 5/0048* (2013.01); *H04L 27/38* (2013.01)

(56) References Cited

U.S. PATENT DOCUMENTS

| 2015/0280841 A1 | 10/2015 | Gudovskiy et al. |
| 2016/0134402 A1 | 5/2016 | Park et al. |
| 2017/0196005 A1* | 7/2017 | Yang ..................... H04L 1/0076 |
| 2019/0158331 A1* | 5/2019 | Pawar ................. H04L 27/2611 |

OTHER PUBLICATIONS

Cisco, et al., "Verizon 5G TF; Air Interface Working Group; Verizon 5th Generation Radio Access; Physical layer procedures (Release 1)," TS V5G.213 v1.0, Jun. 2016, 43 pages.

LG Electronics, "Reference signal for sPDSCH demodulation", 3GPP TSG RAN WG1 Meeting #84bis, R1-162505, Apr. 2016, 9 pages.

* cited by examiner (a)                      (b)

(a)                    (b)

METHOD FOR TRANSMITTING AND RECEIVING REFERENCE SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/006503, filed on Jun. 21, 2017, which claims the benefit of U.S. Provisional Application No. 62/355,319, filed on Jun. 27, 2016, the contents of which are all hereby incorporated by reference herein in their entirety.

TECHNICAL FIELD

The present invention relates to a wireless communication, and more particularly, to a method of transmitting and receiving a reference signal in a wireless communication system and an apparatus therefor.

BACKGROUND ART

In a next generation 5G system, scenarios can be classified by enhanced Mobile BroadBand (eMBB), ultra-reliable Machine-Type Communications (uMTC), massive Machine-Type Communications (mMTC), and the like. The eMBB corresponds to a next generation mobile communication scenario having characteristics such as high spectrum efficiency, high user experienced data rate, high peak data rate, and the like. The uMTC corresponds to a next generation mobile communication scenario having characteristics such as ultra-reliable, ultra-low latency, ultra-high availability, and the like (e.g., V2X, emergency service, remote control). The mMTC corresponds to a next generation mobile communication scenario (e.g., IoT) having characteristics such as low cost, low energy, short packet, and massive connectivity.

DISCLOSURE OF THE INVENTION

Technical Tasks

A technical task of the present invention is to provide a method for a base station to transmit a reference signal in a wireless communication system.

Another technical task of the present invention is to provide a base station transmitting a reference signal in a wireless communication system.

Another technical task of the present invention is to provide a method for a user equipment to receive a reference signal in a wireless communication system.

The other technical task of the present invention is to provide a user equipment receiving a reference signal in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a reference signal by a base station in a wireless communication system, includes transmitting, to a user equipment (UE), information on a modulation scheme of a reference signal for estimating a phase difference between symbols in a time domain and transmitting, to the UE, the reference signal for estimating the phase difference between the symbols to which the modulation scheme is applied.

The modulation scheme of the reference signal may be determined depending on a modulation scheme of a physical downlink shared channel (PDSCH). When the modulation scheme of the PDSCH corresponds to 16-QAM (16-Quadrature Amplitude modulation), the modulation scheme of the reference signal can be determined by 16-QAM that a minimum phase difference between constellations is maintained by $\pi/2$. When the modulation scheme of the PDSCH corresponds to 64-QAM (64-Quadrature Amplitude modulation), the modulation scheme of the reference signal may be determined by 64-QAM that a minimum phase difference between constellations is maintained by $\pi/2$.

The reference signal may be transmitted by boosting power of the reference signal as much as a predetermined value. In this case, the method can further include transmitting information on a predetermined value to the UE.

The reference signal may be continuously transmitted on a plurality of symbols appearing after a front loaded DMRS symbol in the time domain. The reference signal by including information of n bits is transmitted and a value of the n can be determined by the modulation scheme of the reference signal.

The information on the modulation scheme of the reference signal may be transmitted through downlink control information (DCI), MAC-CE, or radio resource control (RRC) signaling.

To further achieve these and other advantages and in accordance with the purpose of the present invention, according to a different embodiment, a method of receiving a reference signal by a user equipment (UE) in a wireless communication system, includes receiving, from a base station, information on a modulation scheme of a reference signal for estimating a phase difference between symbols in a time domain, and receiving, from the base station, the reference signal for estimating the phase difference between the symbols to which the modulation scheme is applied.

The modulation scheme of the reference signal may be determined depending on a modulation scheme of a physical downlink shared channel (PDSCH).

The method may further include receiving information on a predetermined value corresponding to boosted power of the reference signal from the base station. The UE may receive the reference signal by boosting power of the reference signal as much as a prescribed value.

The UE may continuously receive the reference signal on a plurality of symbols appearing after a front loaded DMRS symbol in the time domain.

To further achieve these and other advantages and in accordance with the purpose of the present invention, according to a further different embodiment, a base station for transmitting a reference signal in a wireless communication system includes a transmitter and a processor. In this case, the processor may control the transmitter to transmit, to a user equipment (UE), information on a modulation scheme of a reference signal for estimating a phase difference between symbols in a time domain and control the transmitter to transmit, to the UE, the reference signal for estimating the phase difference between the symbols to which the modulation scheme is applied.

To further achieve these and other advantages and in accordance with the purpose of the present invention, according to a further different embodiment, a user equipment (UE) for receiving a reference signal in a wireless communication system includes a receiver and a processor. In this case, the processor may control the receiver to receive, from a base station, information on a modulation scheme of a reference signal for estimating a phase difference between symbols in a time domain and control the receiver to receive, from the base station, the reference signal for estimating the phase difference between the symbols to which the modulation scheme is applied.

To further achieve these and other advantages and in accordance with the purpose of the present invention, according to a further different embodiment, a method of transmitting a reference signal by a user equipment (UE) in a wireless communication system, includes receiving, from a base station, information on a modulation scheme of a reference signal for estimating a phase difference between symbols in a time domain, and transmitting, to the base station, the reference signal for estimating the phase difference between the symbols based on the information on the modulation scheme.

To further achieve these and other advantages and in accordance with the purpose of the present invention, according to a further different embodiment, a user equipment (UE) for transmitting a reference signal in a wireless communication system includes a receiver, a transmitter, and a processor. In this case, the processor may control the receiver to receive, from a base station, information on a modulation scheme of a reference signal for estimating a phase difference between symbols in a time domain and control the transmitter to transmit, to the base station, the reference signal for estimating the phase difference between the symbols based on the information on the modulation scheme.

Advantageous Effects

According to one embodiment of the present invention, it is able to enhance communication performance by efficiently estimating a blind CFO.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Moreover, in the following description, specific terminologies are provided to help the understanding of the present invention. And, the use of the specific terminology can be modified into another form within the scope of the technical idea of the present invention.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present invention. And, the use of the specific terminology can be modified into another form within the scope of the technical idea of the present invention.

Figure 1:
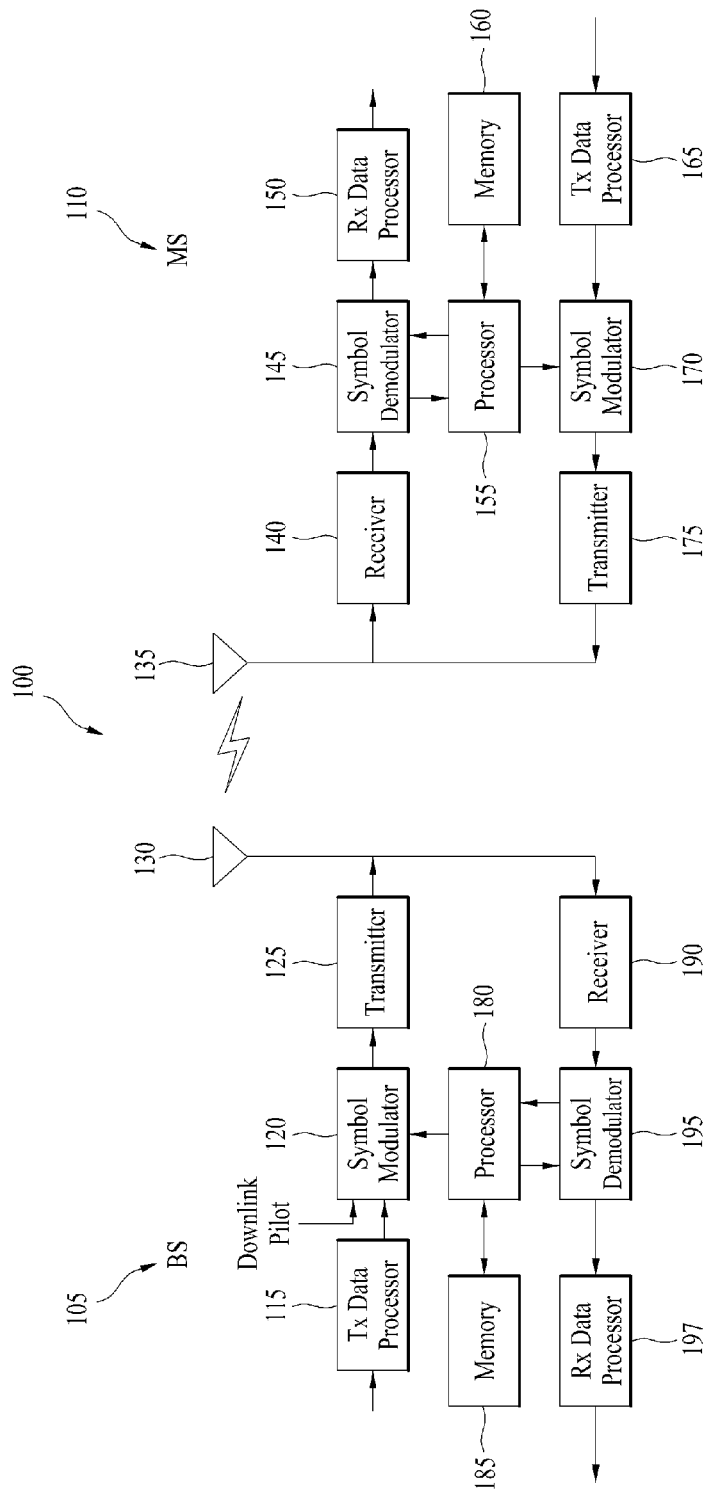
FIG. 1 is a block diagram illustrating configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
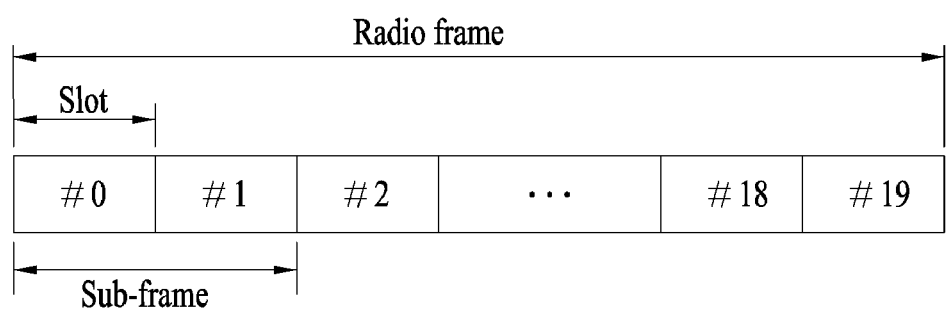
FIG. 2 is a diagram illustrating a frame structure of LTE/LTE-A system.

FIG. 2 is a diagram for LTE/LTE-A frame structure.

Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

A resource block (RB) is defined by 12 subcarriers having 15 kHz spacing and 7 OFDM symbols. A base station transmits a primary synchronization signal (PSS) and a secondary synchronization signal (SSS) for synchronization and a physical broadcast channel (PBCH) for system information on a center frequency of 6 RBs. In this case, the radio frame structure, a signal, and a channel position may vary depending on a normal/extended CP (cyclic prefix) and TDD (Time Division Duplex)/FDD (Frequency Division Duplex).

Figure 3:
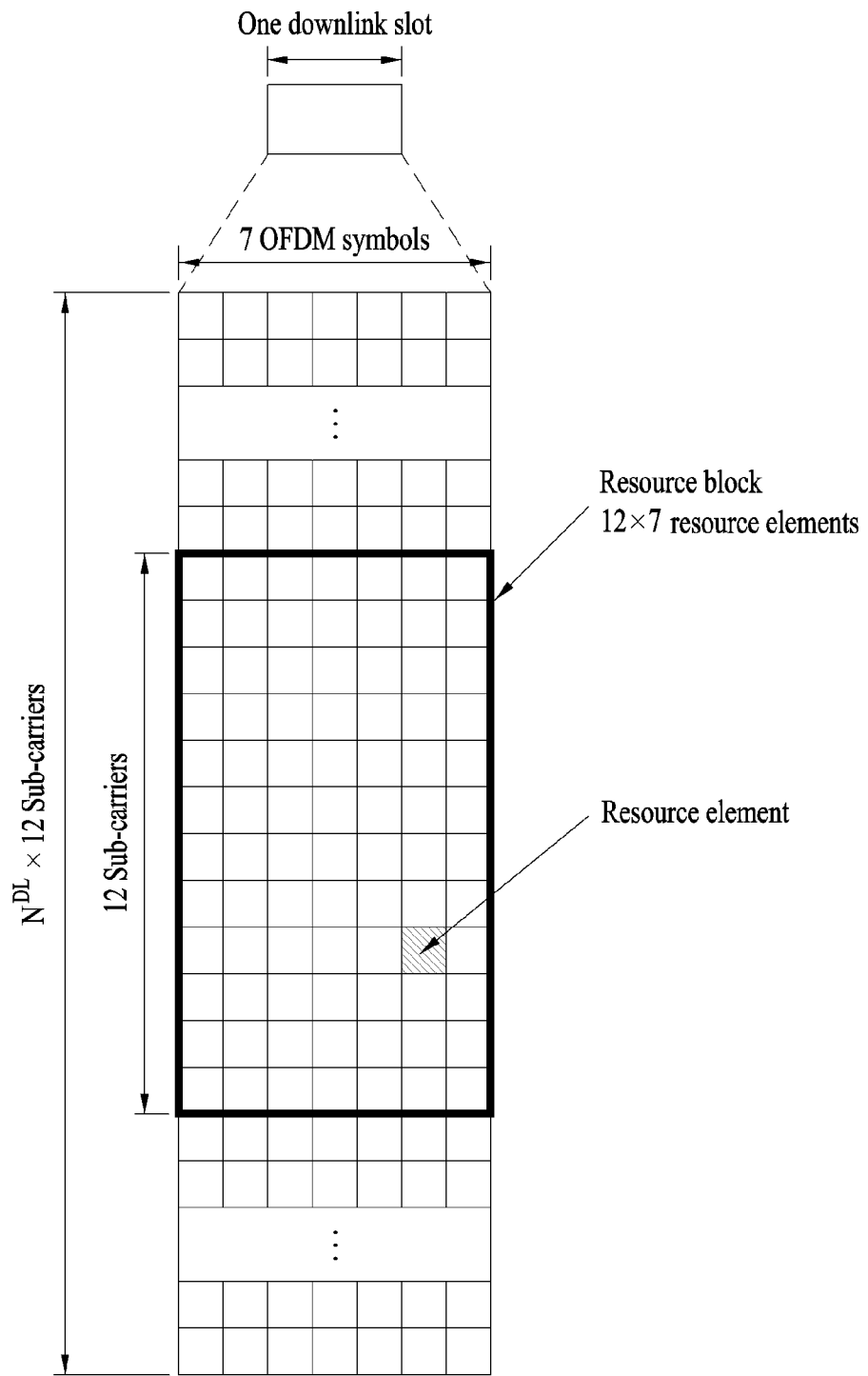
FIG. 3 is a diagram illustrating a resource grid of a downlink slot of 3GPP LTE/LTE-A system corresponding to one example of a wireless communication system.

FIG. 3 illustrates resource grid for one downlink slot.

Referring to FIG. 3, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 4:
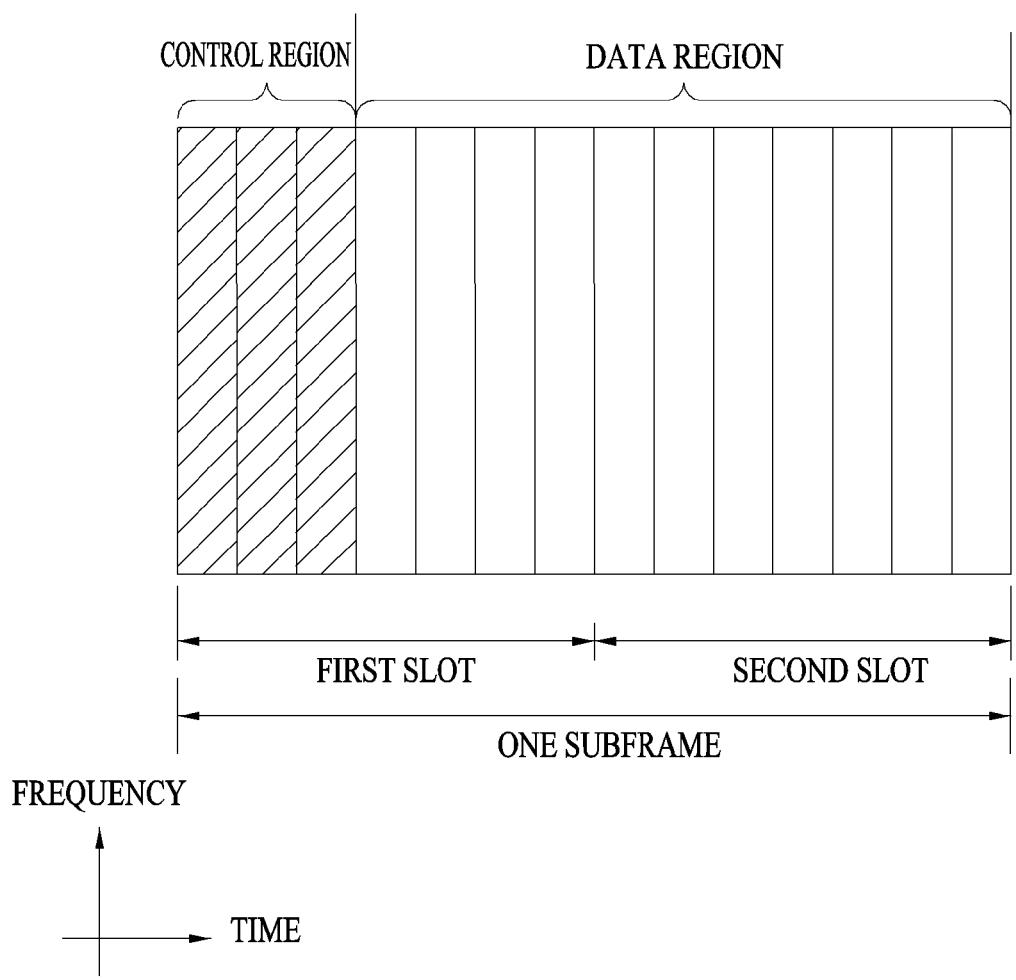
FIG. 4 is a diagram illustrating a structure of a downlink subframe of 3GPP LTE/LTE-A corresponding to one example of a wireless communication system.

FIG. 4 illustrates structure of downlink subframe of exemplary 3GPP LTE/LTE-A system of wireless communication system.

Referring to FIG. 4, a maximum of three or four OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). A DCI format includes a format 0 for UL and includes format 1, 1A, 1B, IC, 1D, 2, 2A, 3, 3A, etc. for DL. The DCI format selectively includes information of hopping flag, RB allocation, MCS (modulation coding scheme), RV (redundancy version), NDI (new data indicator), TPC (transmit power control), cyclic shift, DM RS (demodulation reference signal), CQI (channel quality information) request, HARQ process number, TPMI (transmitted precoding matrix indicator), PMI (precoding matrix indicator), confirmation, etc., according to usage.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
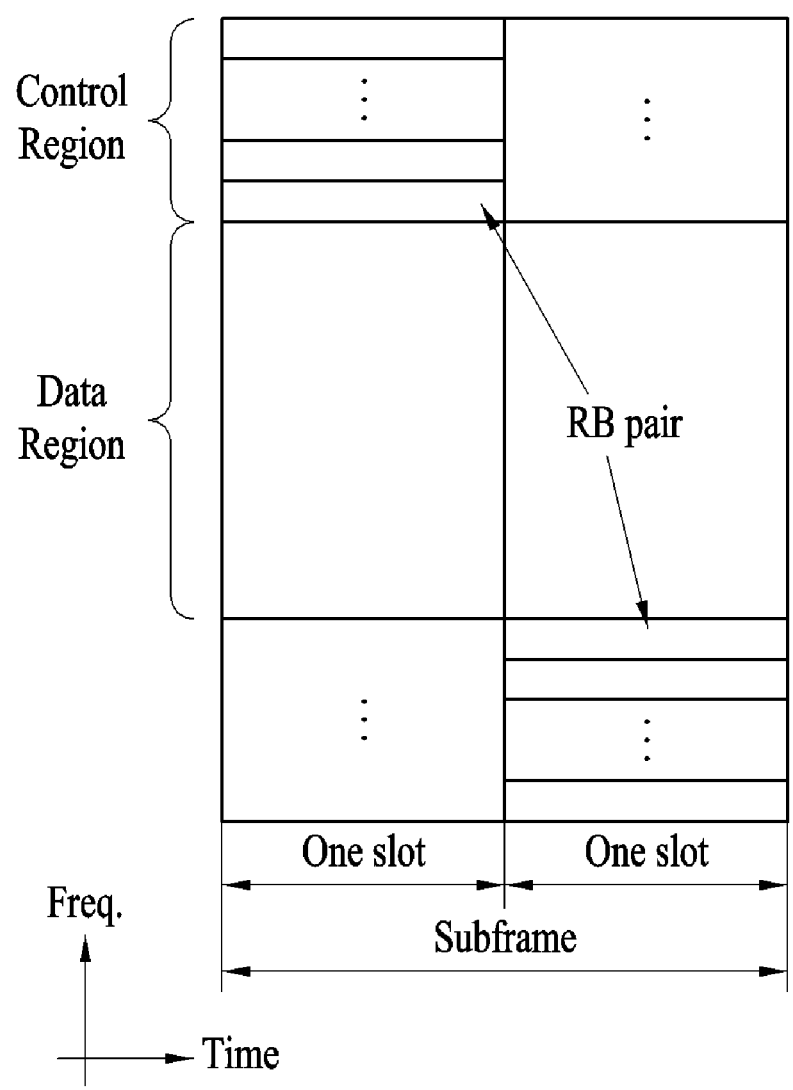
FIG. 5 is a diagram illustrating a structure of an uplink subframe of 3GPP LTE/LTE-A system corresponding to one example of a wireless communication system.

FIG. 5 illustrates structure of uplink subframe of exemplary 3GPP LTE. LTE-A of wireless communication system.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit ACK/NACK is transmitted as a response to a single downlink codeword and a 2-bit ACK/NACK is transmitted as a response to two downlink codewords.

Channel Quality Information (CQI): This is feedback information about a downlink channel. MIMO (Multiple Input Multiple Output)-related feedback information includes a rank indicator (RI), a precoding matrix indicator (PMI), and a precoding type indicator (PTI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

PDCCH (Physical Downlink Control Channel) Transmission

PDCCH corresponds to a downlink control channel. The PDCCH is configured to transmit control information for transmitting PDSCH/PUSCH for a specific UE and transmit a power control command for a plurality of UEs. The PDCCH occupies maximum 4 OFDM symbols in time domain and indicates the number of OFDM symbols assigned to the PDCCH using PCFICH. Meanwhile, the PDCCH is transmitted over the whole band in frequency domain and uses QPSK for modulation. A resource used for transmitting the PDCCH is referred to as a CCE (control channel element). Since a CCE includes 36 resource elements, it may be able to transmit 72 bits via a single CCE. The amount of control information transmitted on the PDCCH may vary depending on a transmission mode. Control information according to a transmission mode is regulated by a DCI format. A UE determines whether or not PDSCH/PUSCH is transmitted according to a PDCCH decoding result. In this case, PDCCH scrambling is performed using UE ID information (C-RNTI) of a corresponding UE. In particular, if a UE detects a DCI format, which is transmitted in a manner of being scrambled by a UE ID of the UE, the UE transmits PDSCH or receives PUSCH according to PDCCH control information. In general, one subframe includes a plurality of PDCCHs capable of being transmitted. Hence, it is necessary for a UE to check whether or not there is control information transmitted to the UE by performing decoding on a plurality of the PDCCHs. However, if the UE performs decoding on all of a plurality of the PDCCHs, complexity is considerably increased. Hence, it is necessary to set a limit on the number of performing decoding. When control information is transmitted via PDCCH, the control information can be transmitted in a manner of concatenating one or a plurality of CCEs with each other. This is referred to as CCE aggregation. Currently, a CCE aggregation level is permitted by 1, 2, 4 and 8. If the CCE aggregation level corresponds to 4, it indicates that control information of a corresponding UE is transmitted in a manner of concatenating 4 CCEs with each other. A UE sets limit on the decoding number according to each aggregation level. Table 1 in the following shows the decoding number according to an aggregation level.

TABLE 1

| Search space $S_k^{(L)}$ | | | Number of PDCCH candidates |
|---|---|---|---|
| Type | Aggregation level L | Size [in CCEs] | $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 1, in case of a common type, a UE performs decoding on PDCCHs, which are transmitted by an aggregation level 4 and 8, 4 times and 2 times, respectively, to determine whether or not control information is transmitted. A specific CCE constructing PDCCH corresponds to a region commonly known to all UEs. In case of a UE-specific type, unlike the common type, a UE performs 6, 6, 2 and 2 times decoding on PDCCHs which are transmitted by an aggregation level 1, 2, 4, and 8, respectively, to determine whether or not control information is transmitted.

In the following, a method of enabling a blind CFO estimation algorithm to operate in High-order QAM using a size ratio and a phase difference of reception signal pairs is proposed in relation to the contents of the present invention.

Zadoff-Chu Sequence

A Zadoff-Chu sequence is also referred to as a Chu sequence or a ZC sequence. In the following description, the Zadoff-Chu sequence is commonly referred to as a ZC sequence. The ZC sequence can be represented by equation 1 described in the following.

$$x_r[n] = e^{\frac{j\pi r n(n+1)}{N}} \quad \text{[Equation 1]}$$

In the equation 1, N, r, and $x_r[n]$ denote a sequence length, a root value, and an $n^{th}$ element of a ZC sequence, respectively. The ZC sequence has 3 significant features described in the following.

1. All elements of ZC sequence are equal to each other in size. (Constant Amplitude)

All elements of DFT result of the sequence are equal to each other in size as well.

2. Correlation between ZC sequence and its cyclic shift version is expressed as follows.

$$(x_r^{(i)})^H x_r^{(j)} = \begin{cases} N & \text{for } i = j \\ 0 & \text{elsewhere} \end{cases} \quad \text{[Equation 2]}$$

$x_r^{(i)}$ is defined as a sequence of cyclic-shifting $x_r$ by i.

The above equation is 0 except a case that auto-correlation of ZC sequence is i=j. (Zero Auto-Correlation)
Since ZC sequence has both Constant Amplitude and Zero Auto-Correlation, it may be called CAZAC sequence.
3. Correlation of ZC sequences having a root value relatively prime to a length N is expressed as follows.

$$x_{r_1}^H x_{r_2} = \begin{cases} N & \text{for } r_1 = r_2 \\ \frac{1}{\sqrt{N}} & \text{elsewhere} \end{cases} \quad \text{[Equation 3]}$$

$r_1$ and $r_2$ are relatively prime to N. For example, if N=111, $2 \leq r_1, r_2 \leq 110$ always satisfies the above equation.

Unlike the auto-correlation of Equation 2, cross-correlation of ZC sequence does not become zero completely.

IEEE In (HT) and 11ac (VHT) frame structures 1. 11n (HT)

Figure 6:
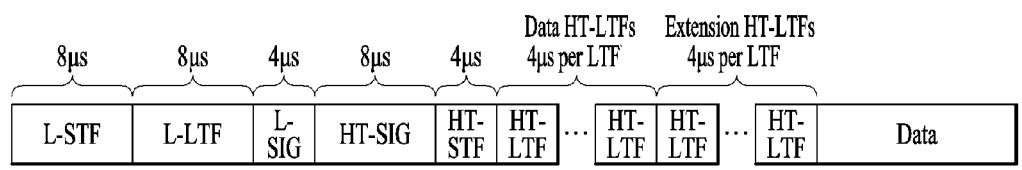
FIG. 6 is a diagram illustrating a frame structure of HT (High Throughput) in a time axis.

FIG. 6 is a diagram illustrating a frame structure of HT (High Throughput) in a time axis.

In this case, L-SIG and HT-SIG denote a Legacy Signal Field and a High Throughput Signal Field, respectively. When a length of an OFDM symbol is defined by 4 μs, the L-SIG corresponds to one OFDM symbol, whereas the HT-SIG corresponds to two OFDM symbols. 11n can forward system information to a user equipment using the field.

Figure 7:
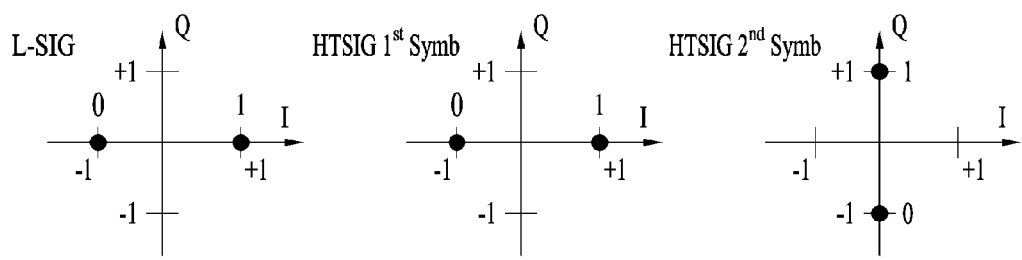
FIG. 7 is a diagram illustrating constellation of HT (High Throughput)

FIG. 7 is a diagram illustrating constellation of HT (High Throughput).

In this case, information is delivered in a manner of being mapped with a constellation illustrated in FIG. 3. Referring to FIG. 7, L-SIG and HTSIG $1^{st}$ symbol use BPSK, whereas HTSIG $2^{nd}$ symbol uses QBPSK.

2. 11ac (VHT)

Figure 8:
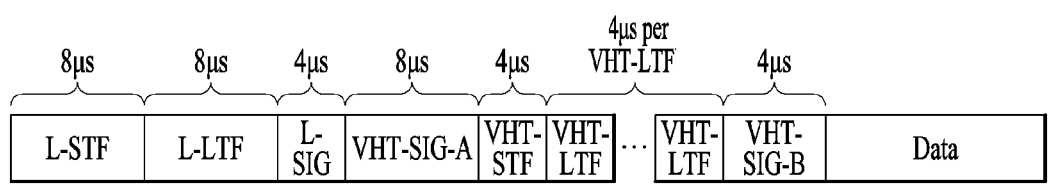
FIG. 8 is a diagram illustrating a frame structure of VHT (Very High Throughput) and FIG. 9 is a diagram illustrating constellation of VHT.
Figure 9:
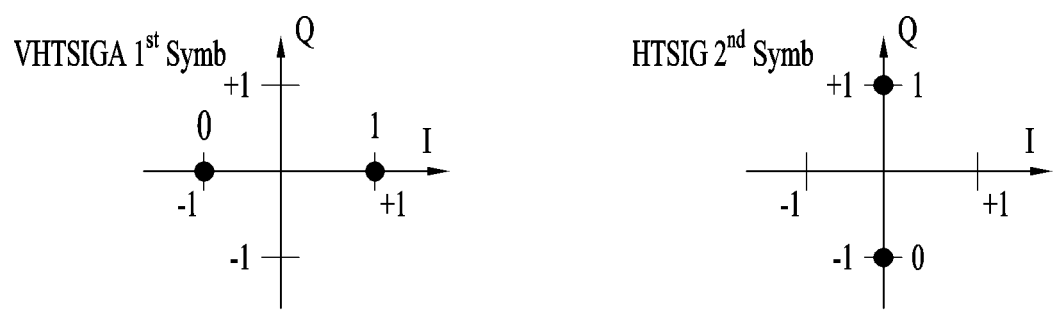

FIG. 8 is a diagram illustrating a frame structure of VHT (Very High Throughput) and FIG. 9 is a diagram illustrating constellation of VHT.

Similar to 11n, VHT can forward system information to a user equipment using L-SIG and VHT-SIG-A. And, the VHT-SIG-A is forwarded in a manner of being mapped with a constellation illustrated in FIG. 9.

Carrier Frequency Offset (CFO)

Definition and characteristics of a CFO are briefly described in the following. The CFO is generated by a frequency difference of a transmitter/receiver oscillator or Doppler. The CFO can be classified into an integer CFO and a fraction CFO (e.g., CFO=2.5, integer CFO=2, fraction CFO=0.5). The integer CFO circularly shifts a sub-channel as much as the abovementioned value, whereas the fraction CFO generates interference between sub-channels.

Frequency Synchronization

Embodiment 1

In M-QAM (Quadrature Amplitude Modulation), it may be able to define a constellation only that a minimum phase difference between random constellation points is greater than a threshold value (e.g. π/2).

An estimation range of a blind CFO estimator is decreasing as a phase difference between constellation points of a data signal is getting smaller. Meanwhile, a data signal rather than a reference signal is defined in a Phase Compensation Reference Signal or a Phase noise Compensation Reference Signal (PCRS) and a common phase error (CPE) and CFO are estimated via the data signal. In this case, a modulation scheme (including a modulation order) of the data signal can be determined based on phase noise on which a corresponding application operates and a CFO size. In particular, when the phase noise or the CFO size is big, the modulation order of the data signal can be restricted to BPSK (Binary Phase Shift Keying) or QPSK (Quadrature Phase Shift Keying).

A PCRS (Phase Compensation Reference Signal) is briefly explained in the following. The PCRS corresponds to a signal for estimating phase noise. The PCRS may correspond to a pilot signal known to both a user equipment and a base station or a signal of which a partial data is changed or duplicated. In the following description, a series of signals for estimating phase noise are commonly referred to as a PCRS.

Figure 10:
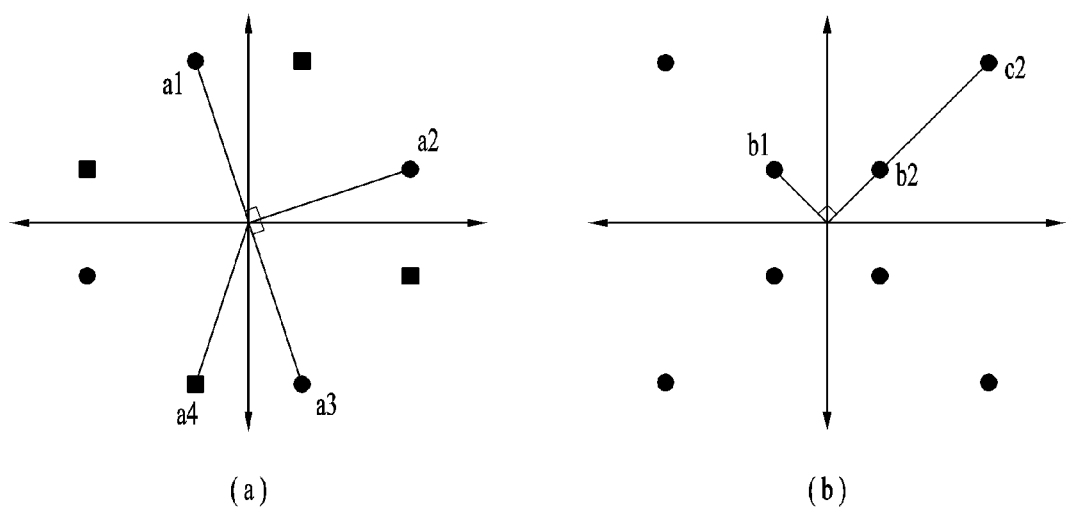
FIG. 10 is a diagram illustrating constellation points of 16-QAM.

FIG. 10 is a diagram illustrating constellation points of 16-QAM.

Referring to FIG. 10(*a*), when a blind CFO is estimated from a data signal having a high modulation order such as 16-QAM, estimation performance can be degraded. In FIG. 10(*a*), a phase difference between a1 and a2 corresponds to π/2, whereas a phase difference between a4 and a3 corresponds to π/6 (or 30 degrees). When a CFO value or a CPE value is big, performance can be rapidly deteriorated due to the a4 and the a3. In particular, as a minimum phase between random constellations is getting smaller, performance deterioration is getting worse. In order to solve the problem of the blind CFO estimator, the present invention proposes restricted QAM that uses a part of constellation points only among constellation points of M-QAM (Quadrature Amplitude modulation) constellation.

16-QAM

Referring to FIG. 10(*b*), a minimum phase difference corresponds to π/2 (e.g., a threshold of the embodiment 1 corresponds to π/2). The minimum phase difference is identical to a minimum phase difference of QPSK and magnitude of constellation is different only. However, in case of a blind CFO estimator, since the blind CFO estimator uses a phase difference only irrespective of magnitude, the magnitude difference has no effect on performance. Consequently, it is able to perform 3-bit transmission while the minimum phase difference identical to that of QPSK is maintained.

64-QAM

Figure 11:
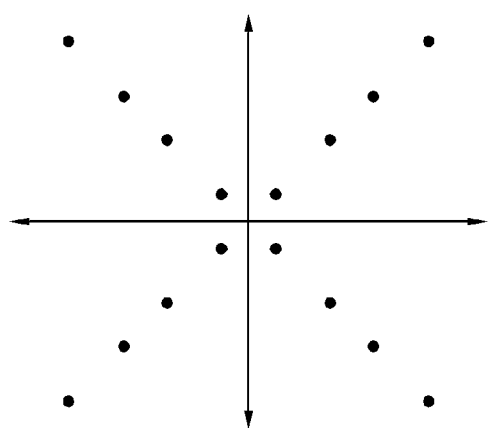
FIG. 11 is a diagram illustrating constellation of restricted 64-QAM (threshold=$\pi/2$)

Since 64-QAM has a minimum phase difference smaller than a minimum phase difference of 16-QAM, performance of a blind CFO estimator is also reduced. FIG. 11 is a diagram illustrating constellation of restricted 64-QAM (threshold=π/2).

In this case, it is able to perform 4-bit transmission while the minimum phase difference identical to that of QPSK is maintained. Meanwhile, it is able to define restricted M-QAM having a minimum phase difference of π/2 by applying the same principle to random M-QAM.

Embodiment 2

A base station can define or allocate a partial region of a physical channel (e.g., (Physical Downlink Control Channel (PDCCH) and a Physical Downlink Shared Channel (PDSCH)) as a region for a PCRS. In this case, the PCRS is defined by a legacy reference signal or a data signal. And, modulation of the PCRS can be defined as Table 2 in the following on the basis of modulation defined in the remaining region (e.g., PDSCH) except the PCRS. Table 2 illustrates a modulation scheme of the PCRS.

TABLE 2

| PDSCH | PCRS |
|---|---|
| BPSK | BPSK (1 bit) |
| QPSK | QPSK (2 bits) |
| 16-QAM (4 bits) | Restricted 16-QAM (3 bits) |
| 64-QAM (6 bits) | Restricted 64-QAM (4 bits) |

Figure 12:
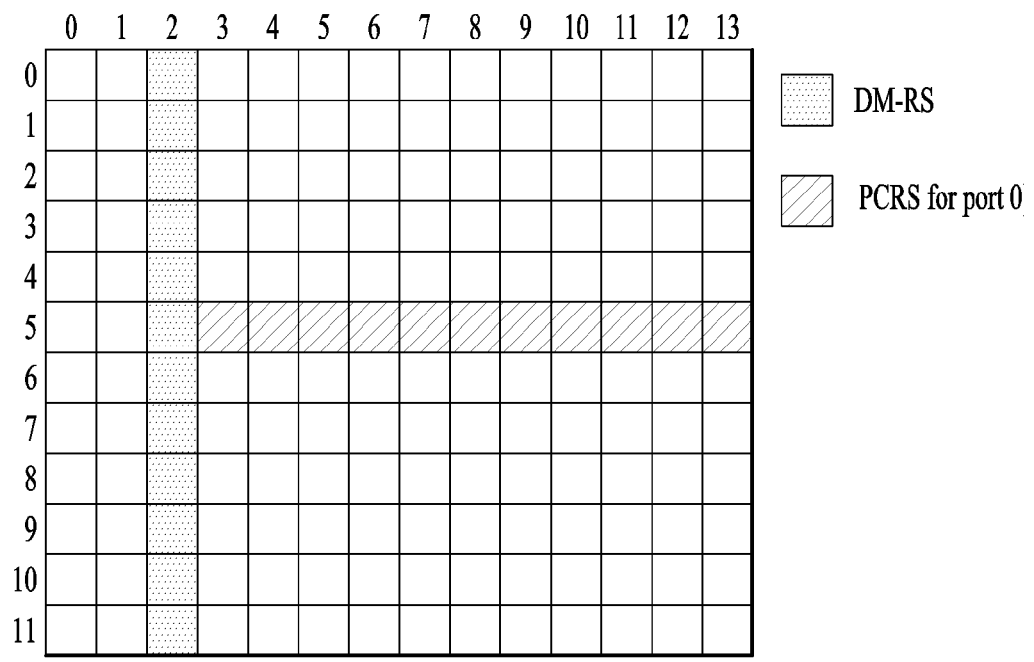
FIG. 12 is a diagram illustrating a PCRS allocated on PDSCH or PDCCH as an embodiment of the PCRS.

FIG. 12 is a diagram illustrating a PCRS allocated on PDSCH or PDCCH as an embodiment of the PCRS.

FIG. 12 illustrates a resource unit consisting of 14 OFDM symbols and 12 subcarriers. Referring to FIG. 12, PCRS for a port 0 is defined on a $5^{th}$ subcarrier. The PCRS is contiguously defined or allocated in a series of time axis. Hence, a user equipment can estimate a phase difference between OFDM symbols in a different time axis. In the resource unit illustrated in FIG. 12, the remaining except a DMRS and a PCRS correspond to general PDSCH or PDCCH.

In the Table 2, modulation of a PCRS has a form identical to modulation of PDSCH or a modified form. In particular, when PDSCH is defined by 16/64-QAM, a PCRS uses a modified restricted 16/64-QAM. Hence, the modulation of PDSCH increases in a form of 1 bit->2 bits->4 bits->6 bits. On the other hand, the modulation of PCRS increases in a form of 1 bit->2 bits->3 bits->4 bits.

As mentioned earlier in the embodiment 1, although the modulation of PCRS increases, a minimum phase difference between random constellation points is maintained by $\pi/2$. Consequently, although modulation increases, performance of a blind CFO estimator and performance of QPSK can be identically maintained in terms of an estimation range. Meanwhile, when the modulation of PDSCH increases, it may have a demerit in that an estimation range of PCRS is reduced or QPSK is used only.

Embodiment 3

According to the embodiment 2, a base station transmits information on PCRS modulation to a user equipment via downlink control information (DCI) or radio resource control (RRC) signaling.

If a size of CFO or CPE is big, it is necessary to expand an estimation range. In this case, it is necessary to lower modulation of PCRS to BPSK or use a reference signal known to both a transmitting side and a receiving side. To this end, the transmitting side (e.g., base station) can directly designate a modulation scheme of a PCRS to the receiving side (e.g., UE) via DCI or RRC.

Meanwhile, the receiving side can also directly trigger modulation of a preferred PCRS to the transmitting side. Meanwhile, the transmitting side can signal a mapping relationship of the PCRS modulation to the UE via DCI or RRC on the basis of a modulation scheme of PDSCH. An example for the mapping relationship of the PCRS modulation can be defined as Table 3 described in the following.

TABLE 3

| PDSCH | PCRS |
|---|---|
| BPSK | BPSK (1 bit) |
| QPSK | BPSK (1 bit) |
| 16-QAM (4 bits) | QPSK (2 bits) |
| 64-QAM (6 bits) | QPSK (2 bits) |

A transmitting side (e.g., base station) can indicate one of Table 2 and Table 3 to a receiving side (e.g., UE). Or, the transmitting end and the receiving end can share Table 2 and Table 3 in advance. When the transmitting end designates a random modulation scheme of PDSCH of Table 2 or a random modulation scheme of PDSCH of Table 3 via DCI or RRC signaling, the receiving end is able to implicitly identify a modulation scheme of PCRS based on Table 2 or Table 3.

Embodiment 4

A transmitting side boosts power of a PCRS as much as a specific value. The transmitting side can signal the specific value to a receiving side via DCI or RRC signaling. In FIG. 11, sizes of all constellation points are not the same. When all PCRSs defined in the same OFDM symbol are mapped by constellation points of a small size, estimation performance can be decreased. In order to minimize the decrease of the estimation performance, the transmitting side boosts transmit power of a PCRS and can signal a power value or a power level of the boosted PCRS to the receiving side via DCI or RRC signaling.

However, when power of the PCRS is boosted only, it may fail to guarantee performance. In this case, the transmitting side may use QPSK only instead of restricted M-QAM as a modulation scheme or a modulation order. In particular, the transmitting side can directly indicate a modulation scheme of a PCRS in consideration of a modulation scheme of PDSCH shown in Table 3 rather than Table 2 or a modulation scheme of PDSCH.

Embodiment 5

Figure 13:
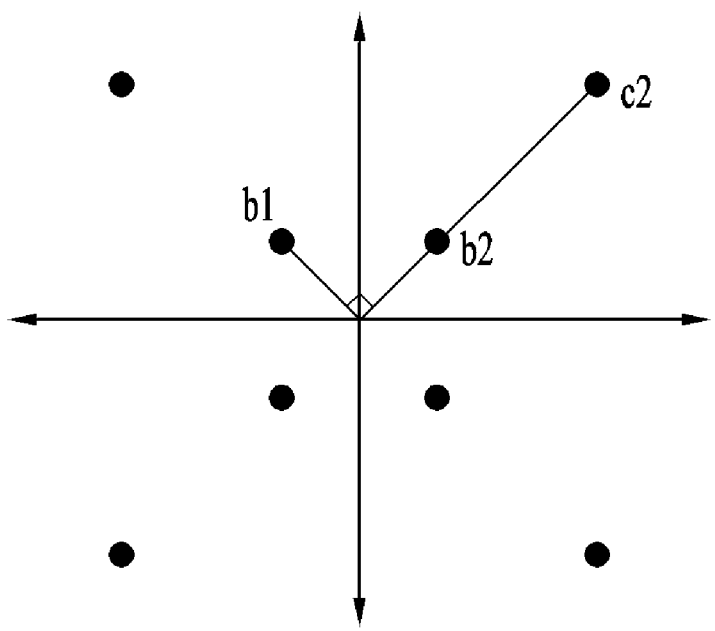
FIG. 13 is a diagram illustrating constellation points of restricted 16-QAM.

FIG. 13 is a diagram illustrating constellation points of restricted 16-QAM.

In case of the restricted 16-QAM, in FIG. 13, positions of b2 and c2 are determined by a minimum distance of 16-QAM.

1. Motivation

When the restricted 16-QAM uses constellation of 16-QAM as it is, power of b2 and power of c2 correspond to 0.2 and 1.8, respectively. Hence, when all data selected by a PCRS have b2, it may lead to performance deterioration.

Meanwhile, since the restricted 16-QAM does not use partial points, a distance between the b2 and the c2 can be modified on the basis of a minimum distance ($d_{min}$) of 16-QAM. In particular, when the distance between the b2 and the c2 is reduced on the basis of the minimum distance ($d_{min}$) of 16-QAM, the power of the b2 can be enhanced. For reference, when the power of the b2 increases, the distance between the b2 and the c2 can be extended compared to the legacy distance.

2. Derivation

1) When positions of the b2 and the c2 correspond to {x,x} and {y,y}, respectively, it may satisfy '$x^2+y^2=1$' in the aspect of average power.

2) When the distance between the b2 and the c2 is matched with the minimum distance ($d_{min}$) of 16 QAM, it may satisfy '$(y-x)^2+(y-x)^2=d_{min}^2=0.4$'.

The x and the y satisfying the conditions of 1) and 2) correspond to 1/sqrt(5) and 2/sqrt(5), respectively.

3. Performance Check

1) Since the power of the b2 corresponds to 2/5, it can be represented as '10 log 10 (0.4)=−4 dB'. (Worst case)

Power of legacy constellation corresponds to 1/5. In particular, when proposed constellation is used, it may increase power as much as 3 dB.

2) When 3 dB boosting is performed based on the embodiment 4, performance can be deteriorated as much as −1 dB compared to QPSK.

Consequently, it may be able to have coordinates of the b2 and the c2: b2=(1/sqrt(5), 1/sqrt(5)), c2=(2/sqrt(5), 2/sqrt (5)).

Figure 14:
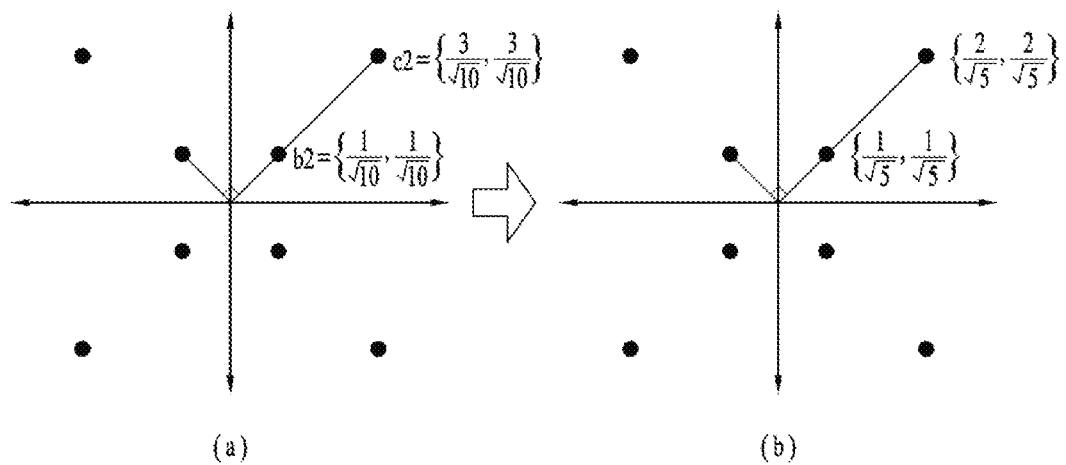
FIG. 14 is a diagram illustrating an example for constellation of restricted 16-QAM.

FIG. 14 is a diagram illustrating an example for constellation of restricted 16-QAM.

FIG. 14(b) illustrates constellation of the restricted 16-QAM proposed in the present invention. When (a) is compared with (b), it is able to see that the b2 moves towards the outside and the c2 moves towards the inside. Consequently, when power of the b2 is enhanced, it is able to mitigate performance deterioration of a PCRS in the worst case.

Embodiment 6

When power boosting is performed at 0, a distance between b2 and c2 is determined using the power boosting and a minimum distance of 16-QAM.

When power boosting is performed while the constellation shown in FIG. 14(b) is maintained, the distance between the b2 and the c2 increases as well. Hence, when the distance and the minimum distance of 16-QAM are identically maintained irrespective of the power boosting, it is able to more increase power of the b2.

For example, it may be able to induce solutions described in the following under the assumption that power boosting is permitted as much as 3 dB.

When positions of the b2 and the c2 correspond to {x,x} and {y,y}, respectively, it may satisfy '$x^2+y^2=2$' in the aspect of average power.

2) When the distance between the b2 and the c2 is matched with the minimum distance of 16 QAM, it may satisfy '$(y-x)^2+(y-x)^2=d_{min}^2=0.4$'.

The x and the y satisfying the conditions of 1) and 2) of the embodiment 6 correspond to $$\sqrt{1-\frac{\sqrt{19}}{10}}, \sqrt{1+\frac{\sqrt{19}}{10}},$$

respectively. When the conditions of 1) and 2) of the embodiment 6 are met, the constellation can be represented as constellation illustrated in FIG. 15.

Figure 15:
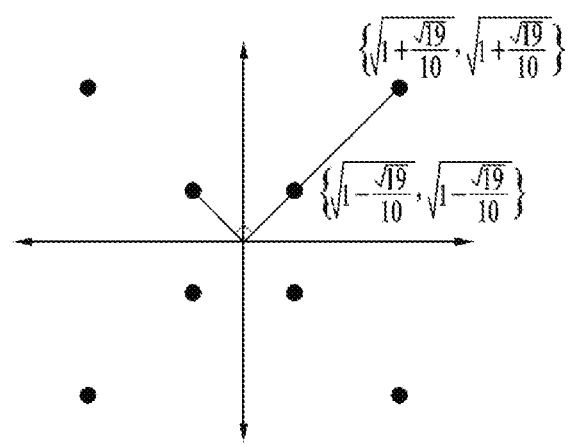
FIG. 15 is a diagram illustrating an example for constellation of restricted 16-QAM when 3 dB power boosting proposed by the present invention is performed.

FIG. 15 is a diagram illustrating an example for constellation of restricted 16-QAM when 3 dB power boosting proposed by the present invention is performed.

As illustrated in FIG. 15, when 3 dB power boosting is performed, performance according to an example of constellation of restricted 16-QAM is described in the following: 1) since power of the b2 corresponds to 1.1282, it can be represented as '10 log 10(1.1282)=0.5239 dB' (Worst case). 2) When 3 dB power boosting is performed using the constellation illustrated in FIG. 14, −1 dB performance deterioration still exists. On the other hand, in case of using the constellation illustrated in FIG. 15, it may be able to expect performance enhancement as much as 0.52 dB.

Various embodiments have been described in the foregoing description. Although the embodiments have been described in a manner of being divided for clarity, the embodiments can be implemented in a manner of being combined.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting and receiving a reference signal in a wireless communication system and an apparatus therefor can be industrially applied to various wireless communication systems including 3GPP LTE/LYE-A, 5G system, and the like.

What is claimed is:

1. A method for transmitting a reference signal by a base station in a wireless communication system, the method comprising:
    transmitting, to a user equipment (UE), information on a modulation scheme (MCS) of a phase compensation reference signal (PCRS), wherein the PCRS is a reference signal for estimating a phase difference between symbols in a time domain;
    transmitting, to the UE, a downlink control information (DCI) including the information on the MCS of a physical downlink shared channel (PDSCH); and
    transmitting, to the UE, the PCRS to which the MCS is applied to the UE,
    wherein the information on the MCS of the PCRS is a mapping table between the MCS of the PDSCH and the MCS of the PCRS,
    wherein the MCS of the PDSCH is determined based on the information on the MCS of the PDSCH,
    wherein the MCS of the PCRS is determined based on the MCS of the PDSCH and the mapping table, and
    wherein based on the MCS of the PDSCH being related to 16-QAM (16-Quadrature Amplitude modulation), the MCS of the PCRS is determined based on a restricted 16-QAM with constellation points with a minimum phase difference of $\pi/2$.

2. The method of claim 1, wherein the PCRS is transmitted by boosting power of the PCRS as much as a predetermined value.

3. The method of claim 2, further comprising transmitting information on the predetermined value to the UE.

4. The method of claim 1, wherein the PCRS is transmitted containing information of n bits and wherein a value of the n is determined based on the MCS of the PCRS.

5. The method of claim 1, wherein the PCRS is continuously transmitted on a plurality of symbols appearing after a front loaded DMRS symbol in the time domain.

6. The method of claim 1, wherein based on the MCS of the PDSCH relates to 64-QAM (64-Quadrature Amplitude modulation), the MCS of the PCRS is determined based on 64-QAM with constellations points with a minimum phase difference of $\pi/2$.

7. The method of claim 1, wherein the information on the MCS of the PCRS is transmitted through downlink control information (DCI), MAC-CE, or radio resource control (RRC) signaling.

8. A method for receiving a reference signal by a user equipment (UE) in a wireless communication system, the method comprising:
receiving, from a base station, information on a modulation scheme (MCS) of a phase compensation reference signal (PCRS), wherein the PCRS is a reference signal for estimating a phase difference between symbols in a time domain;
receiving, from the based station, a downlink control information (DCI) including the information on the MCS of a physical downlink shared channel (PDSCH); and
receiving, from the base station, the PCRS to which the MCS is applied to the UE,
wherein the information on the MCS of the PCRS is a mapping table between the MCS of the PDSCH and the MCS of the PCRS,
wherein the MCS of the PDSCH is determined based on the information on the MCS of the PDSCH,
wherein the MCS of the PCRS is determined based on the MCS of the PDSCH and the mapping table, and
wherein based on the MCS of the PDSCH being related to 16-QAM (16-Quadrature Amplitude modulation), the MCS of the PCRS is determined based on a restricted 16-QAM with constellation points with a minimum phase difference of $\pi/2$.

9. The method of claim 8, further comprising receiving information on a predetermined value corresponding to boosted power of the PCRS from the base station.

10. The method of claim 9, wherein the PCRS, which is transmitted by boosting power of the PCRS as much as a prescribed value, is received.

11. The method of claim 8, wherein the PCRS is continuously received on a plurality of symbols appearing after a front loaded DMRS symbol in the time domain.

12. A base station for transmitting a reference signal in a wireless communication system, the base station comprising:
a transmitter; and
a processor,
wherein the processor is configured to control:
the transmitter to transmit, to a user equipment (UE), information on a modulation scheme (MCS) of a phase compensation reference signal (PCRS), wherein the PCRS is a reference signal for estimating a phase difference between symbols in a time domain;
the transmitter to transmit, to the UE, a downlink control information (DCI) including the information on the MCS of a physical downlink shared channel (PDSCH); and
the transmitter to transmit, to the UE, the PCRS to which the MCS is applied to the UE,
wherein the information on the MCS of the PCRS is a mapping table between the MCS of the PDSCH and the MCS of the PCRS,
wherein the MCS of the PDSCH is determined based on the information on the MCS of the PDSCH,
wherein the MCS of the PCRS is determined based on the MCS of the PDSCH and the mapping table, and
wherein based on the MCS of the PDSCH being related to 16-QAM (16-Quadrature Amplitude modulation), the MCS of the PCRS is determined based on a restricted 16-QAM with constellation points with a minimum phase difference of $\pi/2$.

13. A user equipment (UE) for receiving a reference signal in a wireless communication system, the UE comprising:
a receiver; and
a processor,
wherein the processor is configured to control:
the receiver to receive, from a base station, information on a modulation scheme (MCS) of a phase compensation reference signal (PCRS), wherein the PCRS is a reference signal for estimating a phase difference between symbols in a time domain;
the receiver to receive, from the base station, a downlink control information (DCI) including the information on the MCS of a physical downlink shared channel (PDSCH); and
the receiver to receive, from the base station, the PCRS to which the MCS is applied to the UE,
wherein the information on the MCS of the PCRS is a mapping table between the MCS of the PDSCH and the MCS of the PCRS,
wherein the MCS of the PDSCH is determined based on the information on the MCS of the PDSCH,
wherein the MCS of the PCRS is determined based on the MCS of the PDSCH and the mapping table, and
wherein based on the MCS of the PDSCH being related to 16-QAM (16-Quadrature Amplitude modulation), the MCS of the PCRS is determined based on a restricted 16-QAM with constellation points with a minimum phase difference of $\pi/2$.

* * * * *